(12) United States Patent
Abhyankar et al.

(10) Patent No.: US 7,340,607 B2
(45) Date of Patent: Mar. 4, 2008

(54) PRESERVATION SYSTEM FOR DIGITALLY CREATED AND DIGITALLY SIGNED DOCUMENTS

(75) Inventors: Vishwas G. Abhyankar, Pittsford, NY (US); Victor C. Wong, Rochester, NY (US); Robert V. Reisch, Fairport, NY (US); Robert Breslawski, Brockport, NY (US); Robert S. Jones, Rochester, NY (US); Donald R. Williams, Williamson, NY (US); Robert B. Bayley, Hilton, NY (US); Badhri Narayan, Rochester, NY (US); Louis S. Horvath, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 865 days.

(21) Appl. No.: 10/357,775

(22) Filed: Feb. 4, 2003

(65) Prior Publication Data
US 2004/0153653 A1  Aug. 5, 2004

(51) Int. Cl.
H04K 1/00 (2006.01)
H04L 9/00 (2006.01)
(52) U.S. Cl. .............. 713/176; 713/186; 705/26; 705/27; 707/1
(58) Field of Classification Search ............ 713/176, 713/186; 705/26, 27
See application file for complete search history.

(56) References Cited

U.S. PATENT DOCUMENTS 5,765,152 A   6/1998 Erickson
5,790,677 A *  8/1998 Fox et al. .................. 705/78
6,085,322 A   7/2000 Romney et al.
6,185,683 B1  2/2001 Ginter et al.
6,283,438 B1  7/2001 Walker et al.
6,289,460 B1  9/2001 Hajmiragha
6,553,494 B1* 4/2003 Glass ....................... 713/186
2001/0034836 A1 10/2001 Matsumoto et al.
2001/0049675 A1* 12/2001 Mandler et al. .......... 707/1
2002/0037090 A1  3/2002 Powell et al.
2002/0087429 A1*  7/2002 Shuster .................... 705/26
2004/0117627 A1*  6/2004 Brewington ............ 713/176

FOREIGN PATENT DOCUMENTS

JP   2003-174448   6/2003
WO   00/28726      5/2000

OTHER PUBLICATIONS

Specifications for Digital Signature Standard (DSS); NIST, Federal Information Processing Standards Publication 186 (FIPS 186, May 1994).

* cited by examiner

Primary Examiner—Kambiz Zand
Assistant Examiner—Jason K. Gee
(74) Attorney, Agent, or Firm—Nelson Adrian Blish

(57) ABSTRACT

A method for preserving a digitally signed document (160) in a digital data preservation system (10). A secure preservation request (176) combines the document (160) with a preservation signature (174) that is generated using an identification mark (172) and the document's associated digital signature (168). Once the document (160) is authenticated by the digital preservation system vendor, both the document (160) and the identification mark (172) are recorded onto preservation media (210) in human-readable form.

16 Claims, 12 Drawing Sheets

PRESERVATION SYSTEM FOR DIGITALLY CREATED AND DIGITALLY SIGNED DOCUMENTS

CROSS REFERENCE TO RELATED APPLICATIONS

Reference is made to commonly-assigned copending U.S. patent application Ser. No. 10/000,407, filed Nov. 2, 2001, entitled DIGITAL DATA PRESERVATION SYSTEM, by Wong et al., the disclosure of which is incorporated herein.

FIELD OF THE INVENTION

This invention generally relates to preservation of digital document data and in particular relates to an apparatus and method for long-term preservation of digitally signed documents.

BACKGROUND OF THE INVENTION

In order to clarify the scope of the present invention, it is first necessary to state how the terms "data archiving" and "data preservation" are used in this application. Conventional approaches to digital data archiving, also termed digital data storage, use a variety of storage media such as magnetic tape or disk and optical tape or disk media, and may employ techniques such as periodic tape backup, redundant disk storage, and the like. Use of these storage media and techniques provides some level of assurance that a digital data file can be reliably retrieved for at least a few years after it is initially created and stored. In contrast to digital data archiving, digital data preservation is a relatively new concept for data storage. Only recently has it become apparent that there is considerable need for workable solutions that allow long-term storage of digital data for periods exceeding those provided by established data archiving methods. Conventional data storage and archiving systems provide limited term solutions that allow reliable retrieval of backed-up digital data for a period of approximately 5-10 years. Data preservation systems, on the other hand, must provide solutions that not only allow retrieval of digital data after much longer periods, but also are capable of allowing usability of the data for periods extending decades or even hundreds of years into the future. This life-span is conditioned in large part by the projected life-span of preservation media, expected to last for hundreds of years when stored under suitable conditions.

In contrast with conventional digital data archiving, digital data preservation offers a number of added advantages. For example, in order to be readable and usable years hence, archived digital data requires some type of migration, such as from one media type to another or from an earlier data format to a later data format. Without migration of some kind, archived digital data, over time, gradually becomes unreadable and therefore loses its value. In stages, the archived data first becomes unusable, as data formats, application software and operating systems are revised or replaced. Then, as reading and processing hardware and archival media become obsolete or age with time, the archived data simply becomes unrecoverable. The task of maintaining archived data in a useable form through migration can be daunting, requiring, over a period of years, that the archived data be translated from one data format to another or transferred from one storage medium to another, or transformed from old application to a new application. With repeated migration operations, there is increased likelihood of error and of loss of interpretable data. According to some industry estimates, as much as 5% of stored data can be lost during a typical migration operation. Thus, maintaining archived digital data for long periods of time may be costly and labor-intensive and can involve risk of data loss and the possibility of data tampering.

In contrast to such well-known difficulties with digital data archiving, digital data preservation would allow digital data to be retrievable in a readable state for many years. Ideally, digital data preservation would eliminate, or at least alleviate, any need for data migration and its concomitant costs and risks. Users of digital data preservation systems would thus enjoy the benefits of minimal risk for data tampering, loss, or obsolescence, even in the event of severe infrastructure disruption.

Digitally created documents, created using some sort of logic processor and maintained in file form, are often shared among multiple users in digital form, some only rarely being written to paper. Typically, digitally created documents are stored and transferred as files in open data formats, such as TIFF, HTML, JPEG, XML, PDF, or .txt, for example. By design, some of these open data formats can be routinely interpreted by software running on a number of different computer platforms. Alternately, other common data formats are designed to be proprietary, interpretable only using specific application software. A goal of digital preservation is to retain the usability and original intention of the data without requiring migration of data format or of data storage mechanisms, allowing files to be certifiably unaltered in their interpreted form, able to be used for purposes such as legal evidence, for example.

In order to have preserved records considered as "certifiably unalterable," so that, for example, such records could even be considered as legal evidence, a preservation system would need to provide "Write-Once/Read-Many-Times/Erase-Once" function. Write-Once capability would disallow alteration of preserved data and unauthorized addition of records to preservation media. Read-Many-Times capability would allow retrieval of preserved data from the media with consistent accuracy. Erase-Once capability would assure complete expungement of specific data records as needed.

Current archiving methods for digital data, allowing access to data only in digital format, have a number of shortcomings. Among problems well known by those skilled in the data archiving arts are aging of equipment, limitations in the useful life of magnetic and optical storage media, and inevitable obsolescence of data formats, particularly where data formats are closely associated with specific hardware or with specific versions of operating systems or programming languages.

Long term preservation of digital data requires both that the original data be faithfully preserved and that this data can be interpreted in some form at any time in the future. This requirement means that the organization that stores the digital data can provide, at some future time, access not only to screen displays, printouts, and other system output, but also to the original data used to generate such output. To achieve this goal, methods for retrieving preserved digital data must be, insofar as is possible, independent of specific equipment. While there may have been various attempts at developing universally accepted data formats for different types of files, few standards have been developed or are likely to be adopted.

Human readability is a useful characteristic for a data preservation system. The encoding of data in human-readable form even provides advantages that have previously been overlooked in any scheme for data encoding and archival. For example, there are baseline advantages for verifying authenticity of a document encoded in human-readable form, and thus for irrefutably validating the fidelity of the document to its original source. Future users of a document would then be assured that a preserved version would be a valid and true copy of an original document.

FIG. 1 illustrates the conventional approach to digital data archiving. Digital data is processed by a central processing unit (CPU) 200 running some type of operating system 204. An application 202, using utilities available from operating system 204, provides digital data output in some binary, machine-readable form. This digital data output is only usable to the originating application 202, or to another software application compatible with application 202. The digital data output has value only when interpreted and presented by application 202 in some form, such as that of a static display of text or images, interactive calculation, web page with dynamic links, or multimedia presentation for example. In the conventional model of FIG. 1, a binary storage hardware apparatus 206 stores the digital data output from application 202 onto binary storage media 208, such as magnetic tape, disk, or optical disk. With the arrangement of FIG. 1, the archived data is in an application-dependent form and therefore becomes unusable if the originating application 202 or operating system 204 become obsolete. Archived data also becomes unusable as binary storage media 208 degrades over time.

Technology development, by which early systems and software become obsolete, replaced by increasingly more capable tools, is also an important consideration with respect to digital data preservation. Anticipated developments in data networking technology, in data interface methods, and in imaging technologies for storage and retrieval are likely to bring about corresponding changes in system hardware, with various components of a system becoming obsolete over time. Inherent to the design of a digital data preservation system solution must be a clear-cut strategy for allowing continuous upgrade, component by component, without jeopardizing the integrity and usability of the preserved digital data.

Analog preservation media, such as microfilm, have been widely used for long-term retention of documents, drawings, and flat ASCII files, where data is encoded visually as black and white images. Among proven benefits of such media are long lifetimes, capability for very high resolution, and inherent human readability. These analog preservation media have traditionally been used in systems employing optical cameras for recording and storing analog data, typically images of documents. With the growing need for retention of computer data, these analog media have also been employed in digital document archiving systems, such as the Document Archive Writer, Model 4800, manufactured by Eastman Kodak Company, Rochester, N.Y. Other Computer-Output-Microfilm (COM) recording systems have used similar analog media for long-term retention of processed and displayed data, in printout form. It is significant to note that existing systems use these types of analog preservation media solely for storing black and white images of documents that may be output by a typical application 202 (FIG. 1). Storage of digital data from application 202 is performed using conventional, magnetic or optical binary storage media 208.

A digital data file for preservation by a digital preservation system can originate from any of a number of sources and could comprise any of a number of types of data. As just a few examples, digital data files could be generated from scanned documents or scanned images, where the original source for the data was prepared or handled manually. Digital data files may comprise encoded bitonal images, grayscale images, or even color images, such as the halftone separations used in color printing. Digital data files could be computer-generated files, such as spreadsheets, CAD drawings, forms created on-line, Web pages, or computer-generated artwork. Interactive and sensory stimuli such as sound and animation can also be stored as digital data files. Digital data files might even contain computer software, in source code or binary code format. In summary, there can be a need for long-range preservation of any type of digital data file, whether the actual file content is meaningful to an observer, such as when the file contains a document of some kind, or to a computer, such as when the file consists only of encoded computer program instructions.

Preservation of a digital data file typically requires that the data file be packaged in some standard format, so that at least some amount of metadata, that is, data about the file itself, can be stored with the data. For example, metadata associated with a CAD file might identify the originating software and revision, date of creation and revision of the data, designer name, departmental and project-related identifiers, delivery or completion date, workflow listing, access permissions levels, and the like. Metadata content can include not only basic information such as file ID and look-up information, but also information that optimizes subsequent data retrieval and interpretation, such as image quality metrics, and media/writer characteristics.

The likely obsolescence of specific data formats over time confounds the problem of data preservation. Depending upon the type of data source and upon factors such as the specific nature of a data file, many data formats can be expected to fade from use, thereby jeopardizing possible recall of data content at some future time. A number of organizations have already encountered this problem, acknowledging that sizable amounts of stored data have become very costly or even impossible to retrieve reliably.

Meanwhile, there have been some promising solutions proposed for providing data in a form that will continue to be readable in the future. One method intended to achieve this goal is the extensible markup language (XML) initiative. XML, document type description (DTD), and XML Schema constructs provide a degree of self-definition, inherently open structure, and computer platform portability and provide tools for data formatting by which definitions of data components can themselves be stored as metadata associated with a data file. However, there has been no attempt thus far to provide solutions using extensible markup languages and techniques that support long-term preservation and retrieval of data.

There have been methods disclosed for storing documents in a machine-readable format that is perceptible to a human observer. PCT application 00/28,726 (Smith, Leonhardt, Frary) discloses storage of a two-dimensional document on a laser-writeable optical storage medium, wherein an image of the document is written onto the media along with the binary data representing the digital record. However, the solution disclosed in PCT application 00/28,726 is limited to storage of document data, which is merely a subset of the complete set of data types that may need to be preserved. A significant drawback of the PCT application 00/28726 system is that it employs conventional, optical storage medium, optical disk or tape written using a laser, thus limiting the lifetime of stored data. Furthermore, the Write-Many-Times characteristic of the system disclosed in PCT application 00/28726 makes the system unsuitable for preserving data records that are certifiably unaltered over time. Data written using the system disclosed in PCT application 00/28726 may be marginally "human-perceptible" in the sense that the visible effects of marking the optical medium under varying laser intensities could be perceived and interpreted by a human observer trained to interpret the resultant markings as binary 1s and 0s. However, this encoding method is inefficient in providing truly "human-readable" data that would be directly readable using a scanner or could even be read from the media by a human observer. Without intervening hardware, with its incumbent system dependencies, the binary data stored on the optical medium as disclosed in PCT application 00/28726 would be extremely difficult to obtain.

Commonly-assigned copending U.S. patent application Ser. No. 09/703,059, filed Oct. 31, 2000 discloses long term preservation methods for document data stored in virtual folders, utilizing an analog medium such as film. As with other solutions, this system does not provide the full set of possible preservation functions for a digital file. Significantly, the method noted in U.S. patent application Ser. No. 09/703,059 is limited to preserving the image of the document only, with no attempt to preserve the digitally created document data itself nor the metadata associated with the document in human-readable form.

The above-mentioned solutions, focusing more narrowly on saving documents and images for a time, have provided only "single point" solutions that are not adequate for addressing the larger data preservation problem. Documents themselves make up only a small subset of digital data that must be preserved. Typical forms of digital data other than documents that may require preservation include grayscale and color pictures and diagnostic images; spreadsheet data; satellite data and other instrumentation readings; audio, video and multimedia presentation data; software; HTML content; and database records, for example. It can be appreciated that preservation and retrieval of this broader base of digital data types requires alternate approaches beyond what may be needed for document preservation. For example, with digital data in this broader category, there may be a greater need for retention and retrieval of other underlying, related data, such as source data associated with or used to generate some part of an image or document.

Conventional archiving solutions have largely been implemented in piecemeal fashion. For example, aware of a need to archive specific documents or images, an organization typically purchases a writer and some form of compatible storage media. With a growing body of archived documents and images, some form of reader is then integrated into the system, possibly along with a printer for reprinting the archived image or document. Some form of record-keeping is maintained in order to track documents stored and to manage revision and disposal cycles. Over time, as different equipment becomes obsolete or as newer equipment becomes available, replacement and implementation of additional components allows growth or upgrade of the conventional system. Typically, a considerable allocation of labor is required in order to work with components of the conventional system for entry of new archival documents and images and for servicing retrieval requests from users of the archival system.

In brief, the conventional archiving system must be designed by its users and assembled and integrated with components from different manufacturers. Strategies for system upgrade, for equipment replacement, for network interconnection, and for handling eventual obsolescence of the format of archived information are largely implemented ad hoc, resulting in considerable concern that such systems will provide their users with future access to valuable archived data.

There is growing awareness in legal and technology circles of the need for authentication of document data as genuine. Digital signatures have been developed as a widely accepted method for certifying the validity of an electronic document, where the document data may need to be transferred over a network or recorded onto a data medium. A digital signature is a binary data element that is computed using data characteristics of the electronic document itself and a private key that is unique to the signer. A publication of the NIST (National Institute of Standards and Technology), Federal Information Processing Standards Publication 186 (FIPS 186, May, 1994) entitled "Specifications for Digital Signature Standard (DSS)" terms a digital signature an "electronic analogue of a written signature." The digital signature serves to verify that a document was signed by its originator and that a version of the document is identical to the original, without error in transmission, tampering, or other error.

When a digitally signed document is transmitted or stored, its digital signature is coupled to the document for later verification. A number of patents are directed to systems employing digital signatures, encoded timestamps, or similar verifiers for validating documents being stored or transferred, including the following:

U.S. Pat. No. 6,289,460 (Hajmiragha) discloses a document management system that includes a digital notarization scheme for providing security of stored documents.

U.S. Pat. No. 6,263,438 (Walker et al.) discloses a method and apparatus for timestamping secure document data.

U.S. Pat. No. 6,185,683 (Ginter et al.) discloses a document distribution environment that provides enhanced security and electronic signatures.

U.S. Pat. No. 5,790,677 (Fox et al.) discloses a system and method for electronic commerce using encryption for secure document distribution.

U.S. Pat. No. 5,765,152 (Erickson) discloses a secure on-line electronic media distribution system that employs digital signatures for data authentication.

For each of the above-mentioned patents, only a digital workflow is involved, with digitally signed data handled as binary data elements throughout the process. There is no suggestion of how digitally signed data can be applied and used in systems that handle and preserve data in human-readable form.

While there have been conventional approaches for ensuring document data validity in storage, retrieval, and transfer operations using digital signatures, there are no known methods for preserving a digitally signed document in human-readable form. It can be appreciated that reliable methods for preserving such accompanying authentication information would have substantial value with a digital preservation system that maintains document data in human-readable form, for usability in the near or distant future.

Thus, it can be seen that there is a demand for a digital data preservation system that provides a way of preserving digitally signed document data with authentication, particularly where the document data itself is preserved in human-readable form.

SUMMARY OF THE INVENTION

It is an object of the present invention to provide a digital document preservation system for digitally signed documents. With this object in mind, the present invention provides a method for preserving a document data file provided by a customer to a vendor of preservation services, wherein a digital signature is coupled to the document data file, the method comprising:

(a) decoding the digital signature to obtain a first unique data verifier for said document;
(b) processing the document data file to generate a second unique data verifier for the document;
(c) comparing the first unique data verifier with the second unique data verifier;
(d) coupling an identification mark to the document data file to form a preservation record; and
(e) recording the preservation record onto a preservation medium.

From another aspect, the present invention provides a method for preserving a document data file provided by a customer to a vendor of data preservation services, wherein a digital signature is coupled to the document data file, the method comprising:

(a) forming a secure preservation request by:
  (a1) encoding the digital signature, together with an identification mark from the customer, using the vendor's public key, to form a preservation signature;
  (a2) coupling the document data file with the preservation signature to form the secure preservation request;
(b) transferring the secure preservation request to the vendor;
(c) decoding the preservation signature using the vendor's private key to obtain the digital signature and the identification mark;
(d) decoding the digital signature, using the customer's public key to obtain a first unique data verifier;
(e) processing the document data file to obtain a second unique data verifier;
(f) comparing the first and second unique data verifiers; and
(g) recording the document data file and the identification mark onto a preservation medium in human-readable form.

The methods of the present invention adapt the use of digital signatures, conventionally used for authenticating document data transmitted between sites and not viewable when stored digitally, and the existing support infrastructure currently used for certifying the authenticity of document data using digital signatures for the preservation of digitally signed document data that is preserved in human-readable form.

It is a feature of the present invention that it provides methods for sending a secure request to preserve digital document data wherein a component of the request can be used to authenticate the digital document data.

It is an advantage of the present invention that it allows methods for authenticating the origin and integrity of preserved document data. The present invention provides methods for secure transmittal of document data for preservation, for preservation of authenticated document data, and for retrieval of the authenticated document data.

It is an advantage of the present invention that it provides methods for preserving document data and related authentication data on a long-term preservation medium, in human-readable form. This allows the document data and its related authentication data to be independent of specific computer platform hardware or software, so that future computing equipment will be able to use and to validate the document data preserved thereby.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 2:
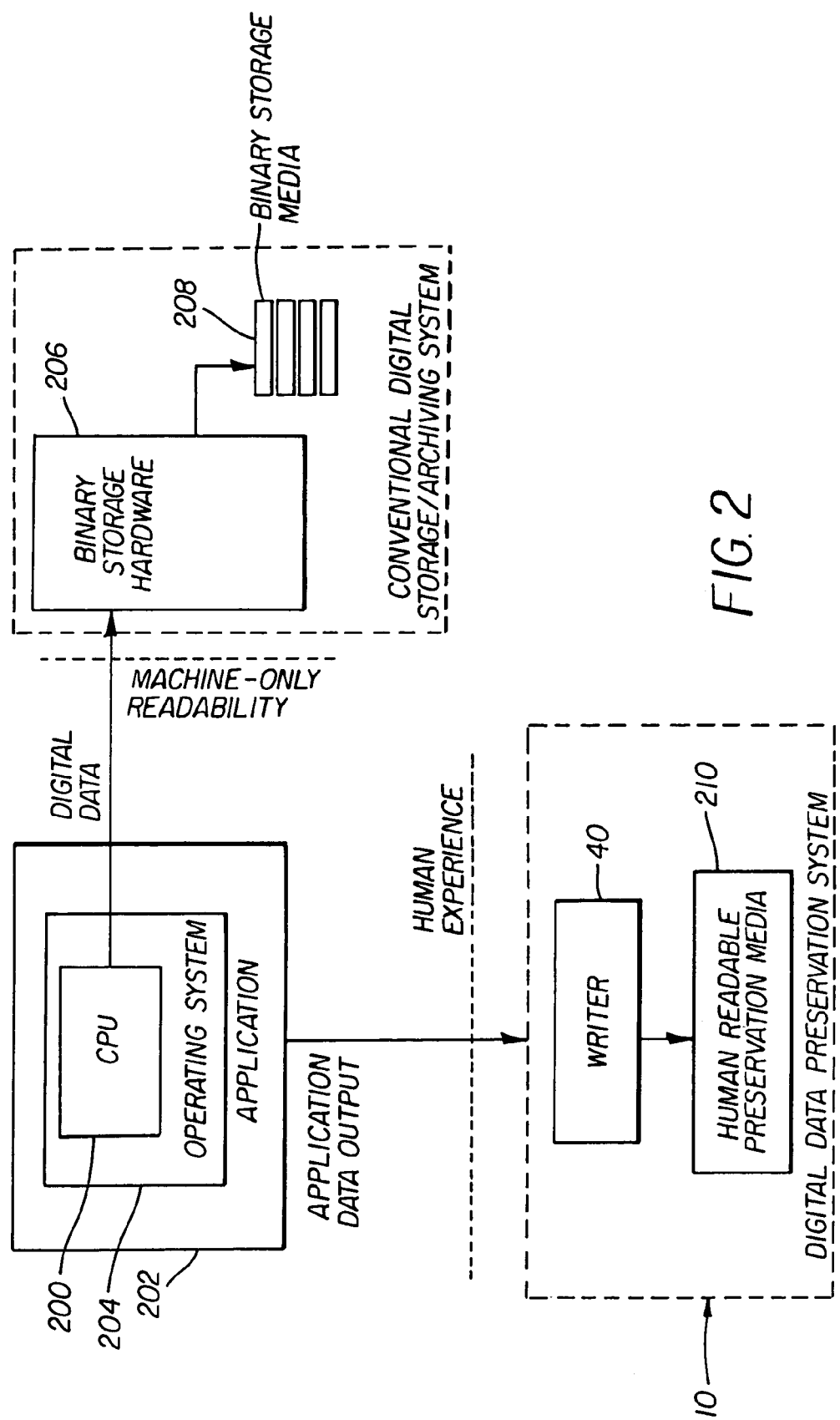
FIG. 2 is a block diagram contrasting the function of a digital data preservation system with the function of conventional digital archiving systems.

It must be emphasized that, while the preferred embodiment of the method of the present invention applies for digital data preservation systems 10, such as shown in FIG. 2, the present invention could be more broadly applied to document data storage systems in general. While the present invention offers particular advantages where document data is preserved in human-readable form, there can be advantages to use of these methods with systems that use standard data archival methods or use some combination of human-readable and machine-readable data representation.

Definition of Encoded, Human-Readable Data Record

It is instructive to define "human-readable data record" as this terminology is used in the present application. A human-readable data record is a unit of encoded digital data that is visibly recorded on a preservation medium. A human-readable data record may have multiple parts, each part encoded in a different manner. For example, a human-readable data record for a JPEG picture could include the following components:

JPEG data encoded in human-readable characters, for example, as ASCII characters;

A rasterized image reproduced on the preservation medium;

A bit-mapped data file represented in primitive form as binary (1/0) data and encoded on the preservation medium as a visible set of binary characters. Such binary character representation could be 1s and 0s, dots and spaces, or other visible markings that encode binary data. However, the preferred embodiment employs a Base-64 encoding, widely used for data file transfer on the Internet and familiar to those in the information arts, so that encoded data is represented as a series of ASCII characters.

Information about the JPEG file, termed metadata, encoded in human-readable characters, for example, as ASCII characters.

Preservation of a JPEG picture in multiple formats preserves the picture so that its image data and associated metadata can be readily retrieved.

A human-readable data record need not contain image data in the conventional sense of a "visual image." Any type of digital data could be stored, visibly formed on a preservation medium, in a similar manner. Thus, for example, a spreadsheet, an audio file, a multimedia presentation, or even a compiled operating system could be encoded and preserved as a human-readable data record using the system and methods of the present invention.

Figure 1:
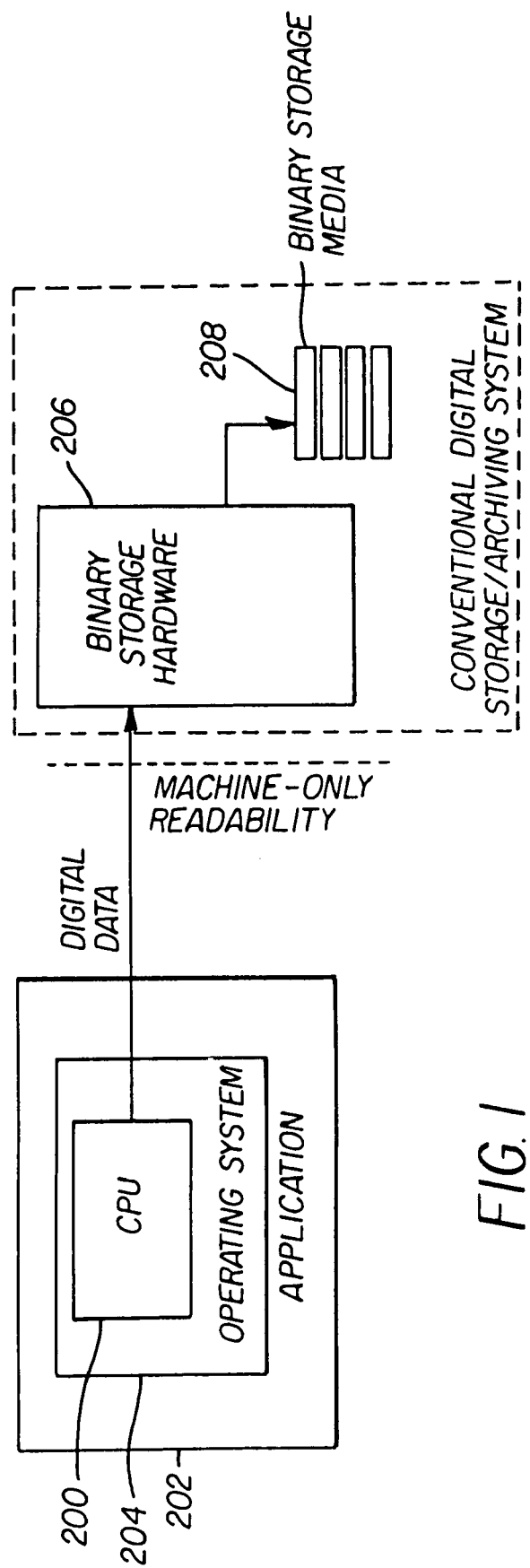
FIG. 1 is a block diagram showing the function of a conventional digital archiving system.

Referring to FIGS. 1 and 2, there is shown a comparison of digital data preservation system 10 with conventional digital archival systems. FIG. 1, described above, shows the function of the conventional archival system. In contrast, FIG. 2 shows both digital data preservation system 10 and a conventional digital archival system. With digital data preservation system 10, writer 40 images onto a human readable preservation media 210. Digital data preservation system 10 preserves a human-readable representation of digital data, independent of operating system 204, CPU 200, and application 202 dependencies. Emphasis is placed on preserving both the experiential representation of data output from application 202 and the data and metadata needed to support that representation. The data that is preserved could be visual, audio, tactile, or other sensory data, or could be some other type of output data for human apprehension.

It is instructive to emphasize the distinction between human-readable preservation media 210 and binary storage media 208 as is used by a conventional archiving system. Unlike a data record that is only machine-readable, a human-readable data record can ultimately be interpreted by a human viewer, possibly aided by magnifying optics. Human-readable preservation media 210 are encoded with markings that are visually discernable, typically under magnification. That is, the ability to read standard alphanumeric characters would be considered as the baseline requirement for retrieval of a human-readable data record by a person or by an instrument. Because of this "standalone" characteristic, the human-readable data record is independent of any specific hardware for reading the data record. The human-readable data record is ordinarily encoded in a specific data format, however, a human reader is able to read the encoded data, with the possible aid of magnification.

Examples of suitable human-readable preservation media 210 include microfilm and related film products and other types of medium having similar long-life expectancy and excellent image stability. In addition to film-based media, some other media types that may be acceptable, in some form, for use as human-readable preservation media include the following:

(a) electrophotographic media, when properly treated and finished;

(b) thermal media, such as thermal dye sublimation media;

(c) inkjet media, particularly using plastic film or reflective materials; and (d) metal plate materials, written using methods such as etching and laser ablation.

The materials that are used for human-readable preservation media 210 are characterized by exceptionally long useful life. Binary storage media 208, on the other hand, include magnetic tapes or disks and optical storage media. Markings on binary storage media 208 are, in general, not readable to the human eye, whether aided or unaided by magnification, and are not suitable for reliable long-term data storage due to their relatively short lifespan and due to hardware and software dependencies for data access from these media. Any change to CPU 200, operating system 204, or application 202 can render data that has been recorded on binary storage media 208 to be unusable. By contrast, data recorded on human-readable preservation media 210 can still be interpreted, regardless of changes to CPU 200, operating system 204, or application 202.

Overview of System 10

Figure 3:
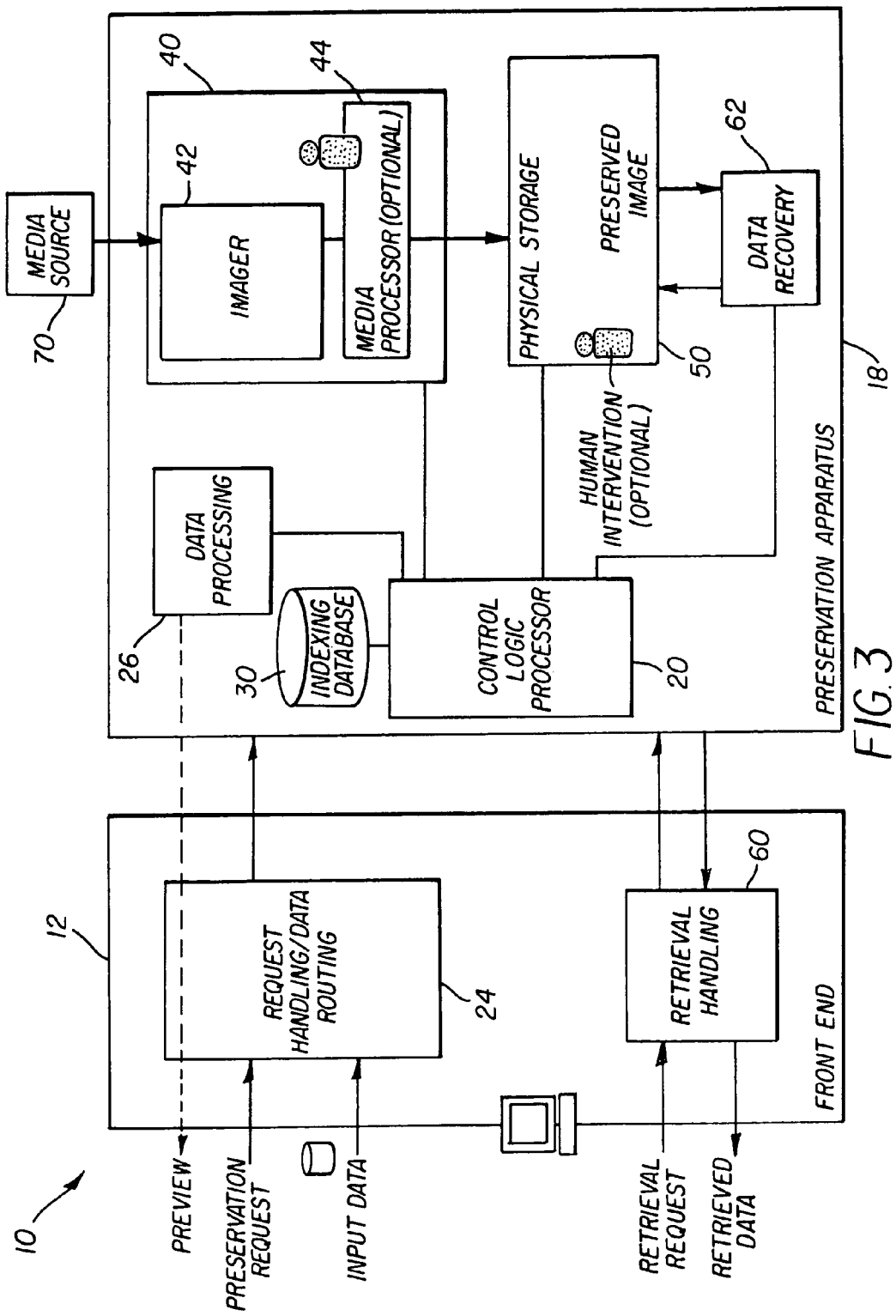
FIG. 3 is a block diagram showing the components of an apparatus of the present invention and their interrelationships.

Referring to FIG. 3, there is shown a digital data preservation system 10 that is configured to accept preservation requests for preserving encoded data records and to accept retrieval requests for providing a copy of an encoded, preserved data record. Modular in design, digital data preservation system 10 comprises a number of components, each of which has a preferred embodiment, but permits of a number of optional embodiments. It is instructive to emphasize that the modular design employed in the integration of components allows digital data preservation system 10 to be suitably scaled to handle volume demands, makes it possible to offer multiple data preservation options in a single system 10, and provides a high degree of flexibility for growth and component-by-component upgrade.

Referring again to FIG. 3, a front end 12, typically implemented using a computer workstation terminal, provides an operator interface for accepting preservation and retrieval requests for encoded data that is managed by a preservation apparatus 18. A request handling/data routing preprocessor 24 acts as an input handler, processing operator requests and, for data preservation requests, accepting input data and information about the input data received by front end 12. For a data preservation request, request handling/data routing preprocessor 24 provides preprocessing for the input data. This preprocessing function may include optimization of the image for suitable reproduction by preservation apparatus 18. A key function of request handling/data routing preprocessor 24 is translating the input data into the standardized format accepted by preservation apparatus 18. Additional functions may include pre-processing required for some types of images. For example, preprocessing may adjust a fine line width within an image where preservation apparatus 18 may not be able to reproduce the original line width. Other specialized image preprocessing functions may enhance brightness, sharpness, or contrast, scale the image, preserve color information, attenuate image noise, or suitably adjust grayscale values to suit the requirements of preservation apparatus 18. Request handling/data routing preprocessor 24 may also perform specialized layout of images in preparation for writing output operation.

It must be noted that preprocessing functions provided by request handling/data routing preprocessor 24 are intended to be "benign" with respect to data record content. That is, preprocessing operations do not change the data contained in the data record. Rather, the preprocessing operations adapt the formatting of this data to suit characteristics of writer 40 and its associated preservation media in preservation apparatus 18.

After initial preprocessing functions have been completed, request handling/data routing preprocessor 24 then routes the input data and information about the input data to preservation apparatus 18. Preservation apparatus 18 provides a modular component for preservation of data that interacts with front end 12, but, except for an allowed set of interface commands and responses, operates as a "black box" with respect to front end 12. Preservation apparatus 18 contains a data processing element 26 that accepts the records for preservation that have been preprocessed by request handling/data routing preprocessor 24 in front end 12. When it receives a data record for preservation, data processing element 26 makes an entry in an indexing database 30. Data processing element 26 then processes and encodes the input data and its associated metadata to generate the encoded data record for preservation. The metadata may include, for example, information about the input data, the indexing entry, specifications of the encoding format, writer and media characteristics, and other image quality information useful for optimizing data retrieval. Data processing element 26 then transmits this encoded data record to a writer 40. In writer 40, an imager apparatus 42 records the human-readable data record onto a segment of raw media (not shown) from a media source 70. Depending on the type of raw media, a media processor 44 may be needed to develop the image for the final encoded data record onto the preservation medium. A physical storage apparatus 50 provides secure housing for maintaining the medium on which the final encoded data record is preserved. Physical storage apparatus 50 could be a climate-controlled storage facility, vault, or other structure used for the task of long-term preservation.

Another function of data processing element 26, in conjunction with request handling/data routing preprocessor 24 is to provide a preview function, which is of particular value for images and documents. Using a sequence of steps outlined below, data processing element 26 generates one or more preview images that can be displayed to an observer at front end 12 or at another sending location. Preview capability provides a visual check on file transfer and conversion operations, enabling operator assessment of any image enhancement operations performed by request handling/data routing preprocessor 24. More importantly, preview capability can allow a user of preservation system 10 the option to choose a level of quality for data storage or retrieval by preservation apparatus 18. Using the preview function, a user can view one or more representations of the data record as it would be restored by digital data preservation system 10.

Retrieval requests from an operator are received by a retrieval handling processor 60, part of front end 12. Retrieval handling processor 60 cooperates with a control logic processor 20 and with physical storage apparatus 50 to access the preserved record data in physical storage apparatus 50 and provide the retrieved data to a data recovery processor 62 in preservation apparatus 18. The retrieved encoded, human-readable data record can then be made accessible to the requesting operator in some form. For example, a retrieved encoded data record could be printed on a printer or displayed on a terminal of front end 12. Or, the recovered human-readable data record could be provided as a digital data file, capable of being transferred to a networked computer for further processing. Post-processing operations could be applied by retrieval handling processor 60 as appropriate. For example, image enhancements could be performed to suit the display or printing of the retrieved human-readable data record.

Front end 12 is capable of customization to suit the preservation needs and workflow requirements of each individual user of digital data preservation system 10 and allows flexibility in accepting input data in a suitable format. A standardized tool kit of interface utilities facilitates the customization of front end 12, so that digital data preservation system 10 is adapted to the user environment. In this way, a user has access to the content of preserved data stored in preservation apparatus 18, but does not handle details of operation of preservation apparatus 18. In its internal operation, meanwhile, preservation apparatus 18 has structured components, data transfer formats, and workflow. The operation of preservation apparatus 18 is thereby standardized in order to ensure consistent results that are independent of customer interface differences and specific input data formats. With this arrangement, for example, a single digital data preservation system 10 having a single preservation apparatus 18 could serve multiple users, each using a front end 12 having the appropriate set of interface tools, where the interface tools are customized for each client, for example.

Data Processing Components

Referring again to FIG. 3, the central role of control logic processor 20 within preservation apparatus 18 can be readily appreciated. Control logic processor 20 interacts with a number of other processors, both in preservation apparatus 18 and in front end 12, to control the various stages of data encoding, recording, preservation, and retrieval. The scale of digital data preservation system 10 and the locations of the various components of digital data preservation system 10 determine how control logic processor 20 is implemented and likewise how its related data processing element 26, request handling/data routing preprocessor 24 in front end 12, and retrieval handling processor 60 are embodied.

In a preferred embodiment, control logic processor 20 is a computer workstation, such as a high-end Windows NT PC or, alternately, a Unix-based workstation. Front end 12 is a separate, networked computer workstation. A single preservation apparatus 18 is capable of interaction with more than one front end 12, such as over a local area network (LAN) or over the Internet, for example. This allows a flexible arrangement with multiple front end 12 workstations, each workstation able to handle preservation requests and to obtain preserved data from preservation apparatus 18.

It must be noted that, for a smaller digital data preservation system 10, a single computer workstation could act as front end 12, performing the functions of request handling/data routing preprocessor 24 as well as those of control logic processor 20. However, there are distinct advantages in separating the functions of networked front end 12 from functions of control logic processor 20 in preservation apparatus 18. Front end 12 can be customized to suit the interface requirements and the workflow of a given customer environment, so that multiple front ends 12 can be networked to a single preservation apparatus 18. Such an arrangement would allow a service bureau, for example, to operate preservation apparatus 18 in order to serve multiple clients, each client equipped with a separate, customized front end 12. Preservation apparatus 18 could be located on a server, for example, accessible to a network of front end 12 clients.

A relatively small set of command functions would allow front end 12 to communicate with preservation apparatus 18 in order to provide data records for preservation and to obtain preserved data records maintained by preservation apparatus 18. By keeping front end 12 distinct from preservation apparatus 18, a customer has the benefit of an interposed level of abstraction relative to characteristics of hardware, storage apparatus, scanning apparatus, and other specifics of preservation apparatus 18. Within preservation apparatus 18, aging or obsolete components could be replaced, redundant systems deployed, or internal workflow sequences re-vamped, all without impact on a customer at front end 12.

It can be readily appreciated that request handling/data routing preprocessor 24 preferably has access to substantial storage space, such as one or more large hard disks, to facilitate efficient transfer of large files by front end 12. Storage capacity would also allow buffering of preservation requests, including buffering of the data to be preserved.

Data processing element 26 receives and processes the input data that has been initially received and processed at request handling/data routing preprocessor 24. The primary output of data processing element 26 is processed data that is ready for imaging as the encoded, human-readable data record and is provided to writer 40. In a preferred embodiment, the output of data processing element 26 is rasterized data for driving writer 40.

In a preferred embodiment, data processing element 26 is a separate workstation computer configured to execute a suitable processing program for the input data. Alternately, such as for a small-scale preservation apparatus 18, the functions of data processing element 26 could also be performed by control logic processor 20 hardware. Or, the functions of request handling/data routing preprocessor 24 in front end 12 and data processing element 26 in preservation apparatus 18 could both be performed by a computer workstation that is separate from the computer workstation used as control logic processor 20.

Retrieval handling processor 60 may comprise a separate computer workstation configured to handle and process retrieval requests. Alternately, such as for a small-scale preservation apparatus 18, the functions of retrieval handling processor 60 could be performed by control logic processor 20 hardware.

Networking Arrangements

Referring again to FIG. 3, it can be appreciated that there are numerous possible configurations for interconnection of the various components of digital data preservation system 10. In a preferred embodiment, for example, a high-speed Ethernet network serves as the interconnection infrastructure for digital data preservation system 10. For optimum performance, front end 12 connects to preservation apparatus 18 using this high-speed connection.

Networking could also be used to connect individual processors within preservation apparatus 18 as well as within front end 12. With this arrangement, the individual computer workstations within preservation apparatus 18 that are configured as control logic processor 20, data processing element 26, and retrieval handling processor 60 can then be deployed at different locations, in a manner suitable for the scale and scope of digital preservation apparatus 18. For example, it is generally favorable to have data processing element 26 situated near writer 40, however, it may be preferable to locate other logic control components at a different location.

However, network topology is not limited to an Ethernet or local area networking (LAN) scheme. It may be advantageous, for example, to dispose writer 40 in a protected environment at another location. In such a case, component interconnection could employ any of a range of networking types, from high-end, high-speed dedicated telecommunications links to Internet connection, to dial-up modem connection, for example.

Networking also allows flexibility for growth in system capabilities and options. As one example, it may be of benefit for a system 10 to offer its customers the option of imaging using any one of a number of different technologies for imager 42. In an expanded, networked embodiment of the present invention, multiple sites for imager 42 are provided. At one site, silver-halide based microfilm in one size is imaged; another site prints encoded, human-readable data records onto a photosensitive medium using a dry process. Linked to both sites, a single data processing element 26 can then prepare the desired record in a suitable manner for the intended data preservation media format. Alternately, each site could employ its own data processing element 26.

In addition, networking also allows flexibility for growth in system scale. Using the networked system arrangement of the present invention, a system can be enlarged to comprise multiple writers 40, multiple sites providing physical storage apparatus 50, and a number of different data recovery processors 62.

Generating a Digital Signature

Figure 8:
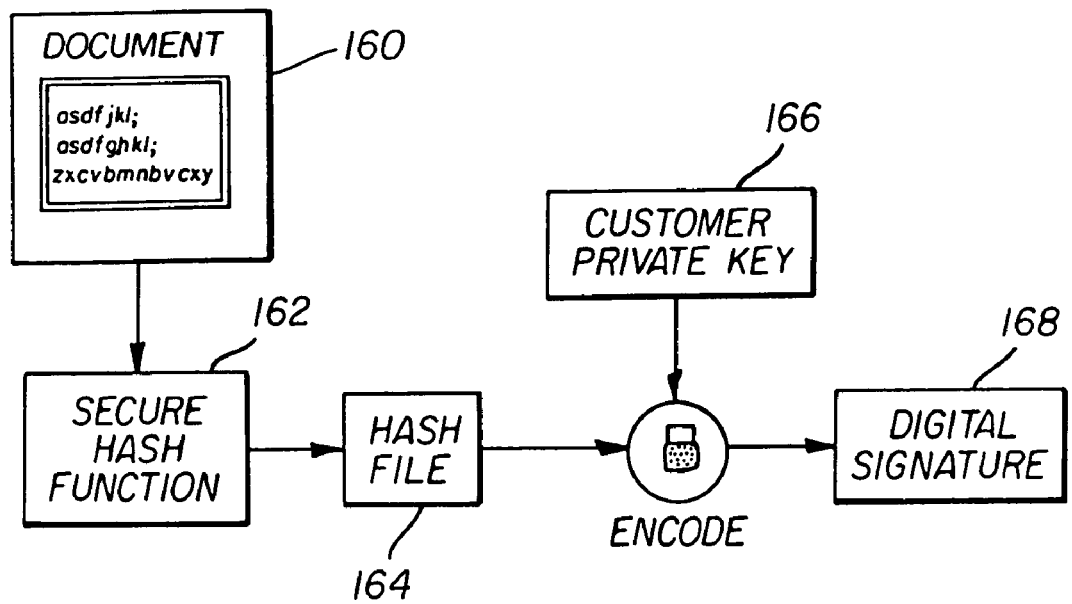
FIG. 8 is a block diagram showing the process for generating a digital signature for a document.

A "digitally signed document" is an electronic document that has an associated digital signature file that can be decoded to verify the authenticity of the document, with particular respect to document transmittal. Referring to FIG. 8, there is shown a process for generating a digital signature 168. A document 160, in electronic form, is processed by means of a secure hash function 162. Hash function 162 produces a hash file 164 that serves as a digital "thumbprint" of document 160. Hash functions 162, well known in the data encoding and verification arts, are one type of data integrity verification transform that provide, as a result of processing an input file, a unique data verifier such as hash file 164. The slightest alteration of the input file causes a pronounced change in the content of resulting hash file 164. Hash function 162 thereby allows verification that document 160, when received, is identical to document 160 when transmitted.

As noted in the background information above, FIPS PUB 180 defines a standard secure hash algorithm (SHA) used for digital signature implementation. In the terminology used is FIPS PUB 180, the hash function acts as a "message digest."

This message digest corresponds to hash file 164 of the present invention, as shown in FIG. 8.

To allow later verification of document 160 data, hash file 164 is encoded using a customer private key 166, to provide a digital signature 168 to accompany transmittal of document 160. While hash function 162 that produces hash file 164 is a standard type of data integrity verification transform, other types of lesser-known data integrity verification transforms that provide some form of unique data verifier could be used. However, it must be emphasized that, for document data preservation systems in particular, the use of a well-established data integrity verification transform is recommended, so that any future data retrieval request could be suitably handled in order to authenticate retrieved document data using the same data integrity verification transform. The use of proprietary data integrity verification transforms can present risks that future systems will be unable to apply proprietary algorithms without significant cost, for example.

Generating a Secure Preservation Request

Figure 4:
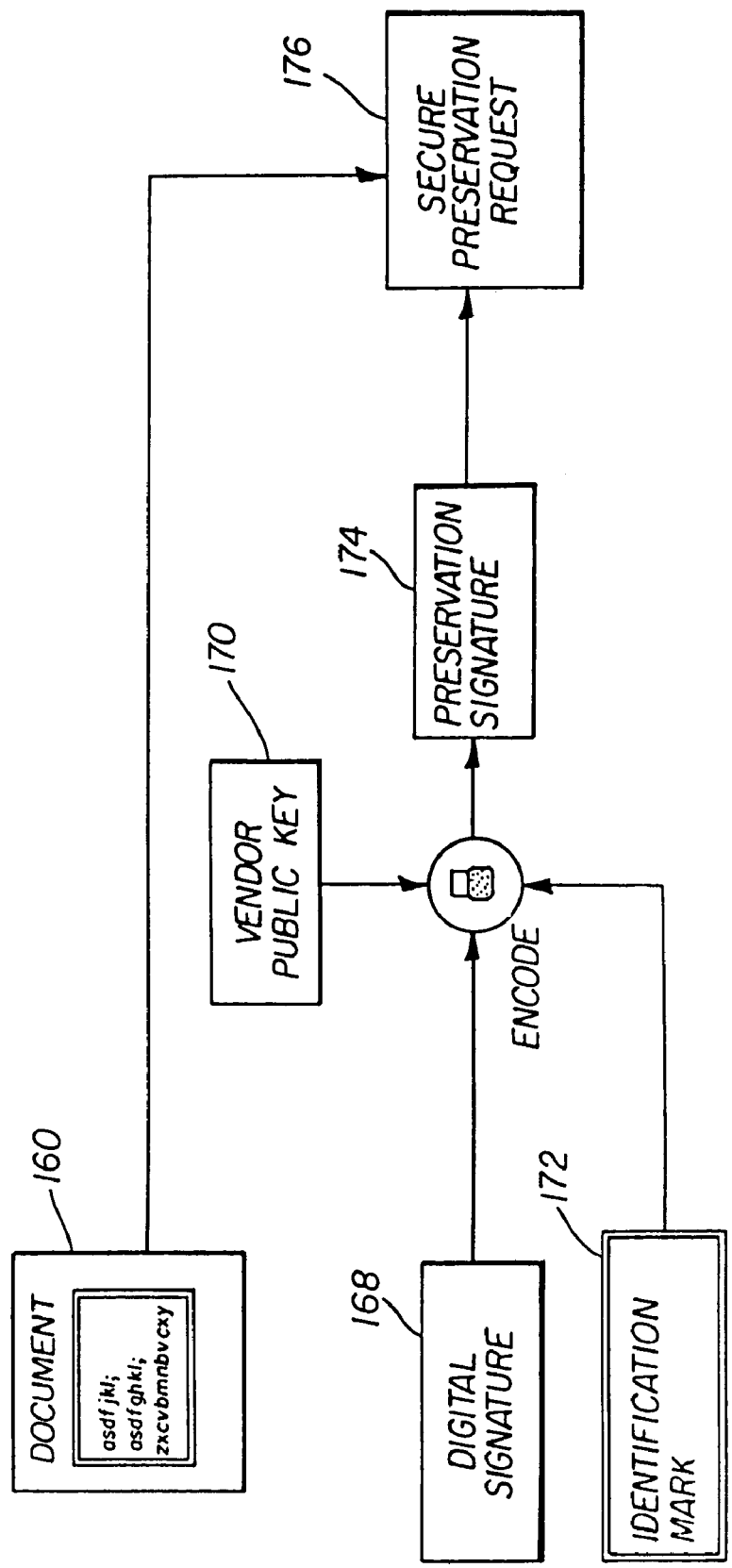
FIG. 4 is a block diagram showing the flow of data for providing a secure preservation request for document data.

Referring to FIG. 4, there is shown the process for creating a secure preservation request 176 to be submitted by a customer to the vendor who operates digital data preservation system 10 in a preferred embodiment. Digital signature 168 is combined with an identification mark 172, which is human readable and uniquely identifies the sender of document 160 to digital data preservation system 10. Depending on the level of security and authentication needed, identification mark 172 may comprise any of the following, for example:

Plain-text typed name, as in an email communication;
Digitized image of a handwritten signature;
Electronic letterhead;
Biometric mark, such as a unique indicator derived from a bodily feature, such as a finger print; or
Digitized image of a signature stamp or seal.

In a preferred embodiment, identification mark 172 comprises a digitized image of a handwritten signature. The digitized image would be in rasterized form, such as a raster TIFF file, for example. As an alternative, identification mark 172 might comprise some other type of digitized image, such as any of the above examples, that authenticates the identity of a customer. As is shown in the process diagram of FIG. 4, the customer encodes combined digital signature 168 and identification mark 172 using a vendor public key 170 which has been obtained from a trusted, public domain public key server. This combination of digital signature 168 and identification mark 172 after encoding provides a preservation signature 174. This encoded preservation signature 174, which can then be decoded only by the receiving vendor, helps to assure secure transfer of identification mark 172 and its accompanying digital signature 168. The combination of preservation signature 174 and document 160 thereby forms a secure preservation request 176, which is transmitted to digital data preservation system 10. As a further option, document 160 itself may alternately be encoded, using a customer private key 166 or other suitable encoding mechanism, for example.

The data processing steps shown in FIG. 4 are typically performed at a customer workstation, such as a personal computer or workstation having sufficient computational and memory resources for the encoding and data manipulation tasks indicated. Public key/private key encoding is performed using techniques well known in the data encoding arts. Public keys are provided by a public domain server, as is currently performed in conventional secure data transfer.

As a result of the processing steps shown in FIG. 4, preservation signature 174 helps to further authenticate the transmission of digital signature 168 along with identification mark 172, as originally provided by the customer.

After completion of the processing steps given in FIG. 4, secure preservation request 176 can be transmitted over a network, or otherwise transferred, such as on some storage medium, from the customer site to digital data preservation system 10. In a preferred embodiment, secure preservation request 176 is sent as a single unit, in the same file transfer operation. However, for improved security, preservation signature 174 could be provided separately, using a separate file transfer operation, such as on a separate, secure network or on a storage medium, for example.

Authenticating Document 160

Figure 5:
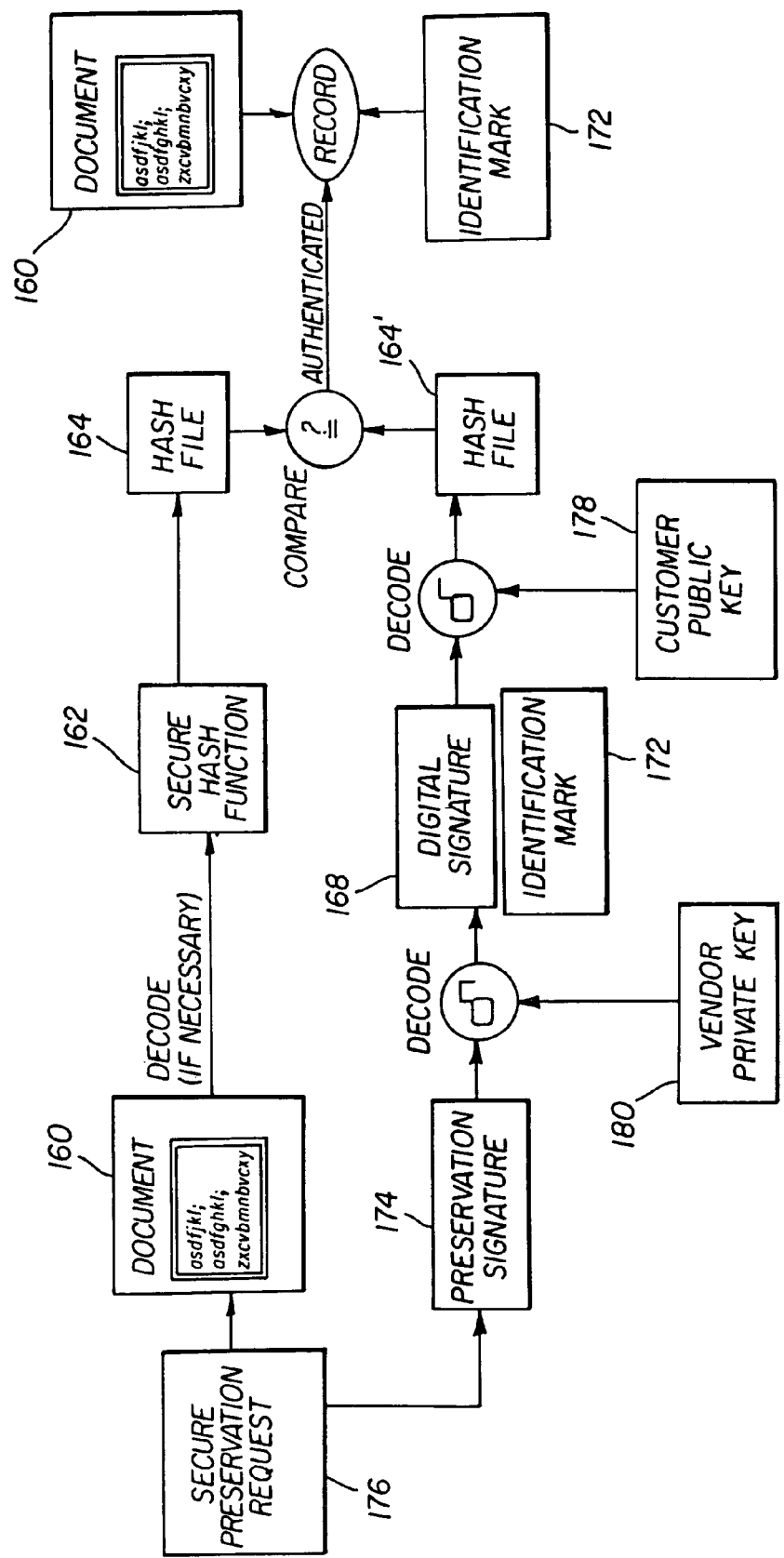
FIG. 5 is a block diagram showing the flow of data for verifying a secure preservation request received and recording the authenticated document onto preservation medium by a vendor of document data preservation services.

Referring to FIG. 5, there is shown the processing that is performed at digital data preservation system 10 once secure preservation request 176 has been received. The processing in FIG. 5, typically performed by front end 12, verifies that an authentic document 160 has been provided. Following the authenticating steps of FIG. 5, document 160 and its associated identification mark 172 can be written and preserved by digital data preservation system 10.

As shown in FIG. 5, the vendor providing digital data preservation system 10 services receives secure preservation request 176, containing both document 160 and preservation signature 174. Preservation signature 174 is decoded at the receiving site, using vendor private key 180, to provide digital signature 168 and identification mark 172. Authentication of document 160 is provided by first decoding digital signature 168 using customer public key 178, which is obtained from a public key server, in order to provide a decoded hash file 164'. In a parallel way, document 160 is processed, using the same secure hash function 162 as was used by the customer in encoding, with reference to FIG. 8, in order to generate hash file 164. Then, hash file 164 is compared with decoded hash file 164' as part of a verify step. When both hash file 164 and decoded hash file 164' are identical, document 160 can be authenticated. At this point, the vendor can be assured, with all reasonable probability, that document 160, as received and decoded, is authentic.

Additional levels of validation and security can be provided, in addition to that available using the process shown in FIG. 5. In an alternative embodiment, for example, document 160, received as part of secure preservation request 176, could have been encoded by the customer, using the customer's private key. In such a case, encoded document 160 must then be decoded at digital data preservation system 10 using customer public key 178 before being processed with secure hash function 162. This additional processing verifies that document 160 was received from the specific customer site only.

Referring back to FIG. 2, once document 160 is authenticated, it is ready to be written onto human-readable preservation media 210. In the preferred embodiment, identification mark 172 is physically coupled to its associated document 160 by being recorded onto the same piece of human-readable preservation media 210, as shown in FIG. 5. For example, document 160 and its associated identification mark 172 can be written onto the same piece of film. When recorded, identification mark 172 provides a viewable and verifiable authentication of its accompanying document 160, much like the function of digital signature 168 for its associated electronic document 160, but with the advantage that identification mark 172 is recorded onto human-readable preservation media 210. This arrangement helps to preserve document 160 data in a form that is independent of specific operating systems or hardware components.

In a preferred embodiment, both identification mark 172 and its associated document 160 are encoded in human-readable format, as images. However, some other method of associating identification mark 172 to document 160 could be used or other encoding methods could be provided by digital data preservation system 10 within the scope of the present invention, such as using XML representation or encoding in some other widely accepted standard form, for example.

Alternate Embodiments

Figure 6:
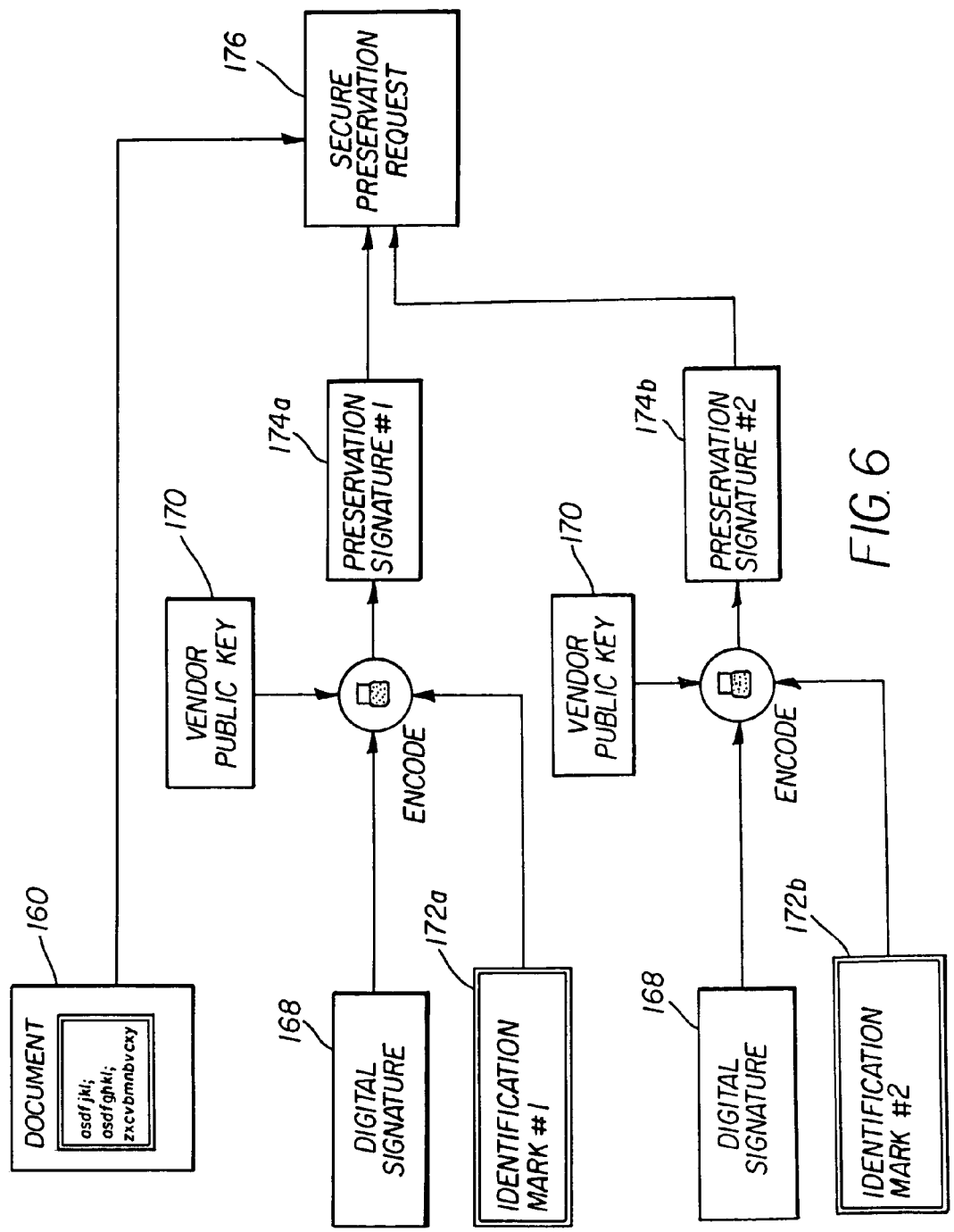
FIG. 6 is a block diagram showing an alternate flow of data for providing a secure preservation request for document data when there are multiple signers of the document.

In some cases, positive authentication of document 160 may require that more than one identification mark 172 be provided as part of secure preservation request 176. Referring to FIG. 6, there is shown an alternate process in which a first identification mark 172a and a second identification mark 172b are incorporated within secure preservation request 176. As shown in FIG. 6, and in similar manner to the process of FIG. 4, both first and second identification marks 172a and 172b are encoded using digital signature 168 and vendor public key 170. A first preservation signature 174a and a second preservation signature 174b result and are then incorporated into secure preservation request 176.

Figure 7:
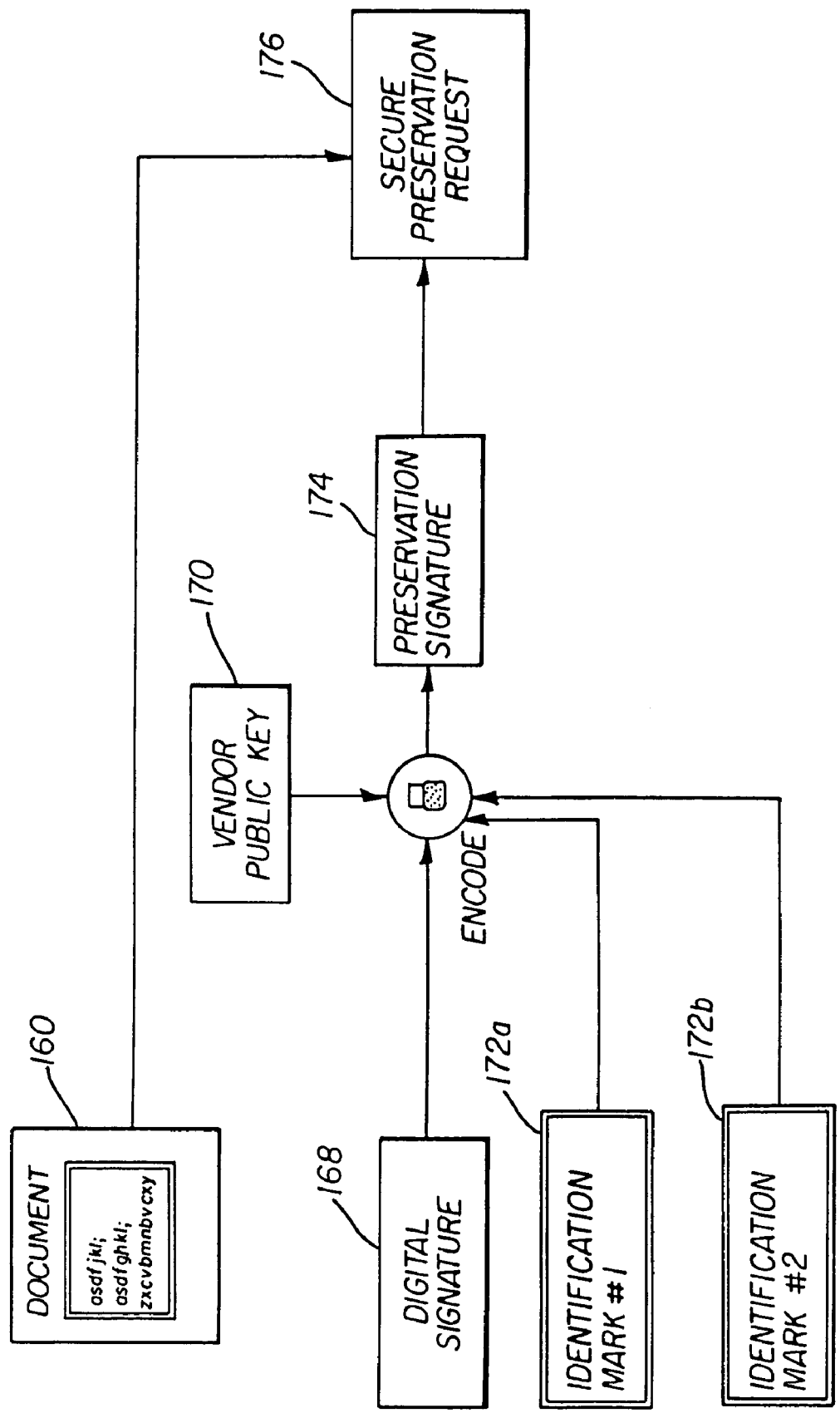
FIG. 7 is a block diagram showing another alternate flow of data for providing a secure preservation request for document data when there are multiple signers of the document.

Referring to FIG. 7, there is shown another alternate embodiment in which multiple identification marks 172 can be incorporated within the same preservation signature 174. In this embodiment, both first and second identification marks 172a and 172b are encoded with digital signature 168 to generate preservation signature 174. As with the method shown in FIG. 6, the method of FIG. 7 could be extended to allow any number of identification marks 172 to be incorporated into preservation signature 174. Decoding operation, where multiple identification marks 172 are provided, follows the same overall sequence shown in FIG. 5, with appropriate steps duplicated for handling each individual identification mark 172. Once document 160 has been authenticated, all identification mark 172 that have been provided are then recorded, with document 160, onto human-readable preservation media 210.

Validation at the Receiving Site

Figure 9:
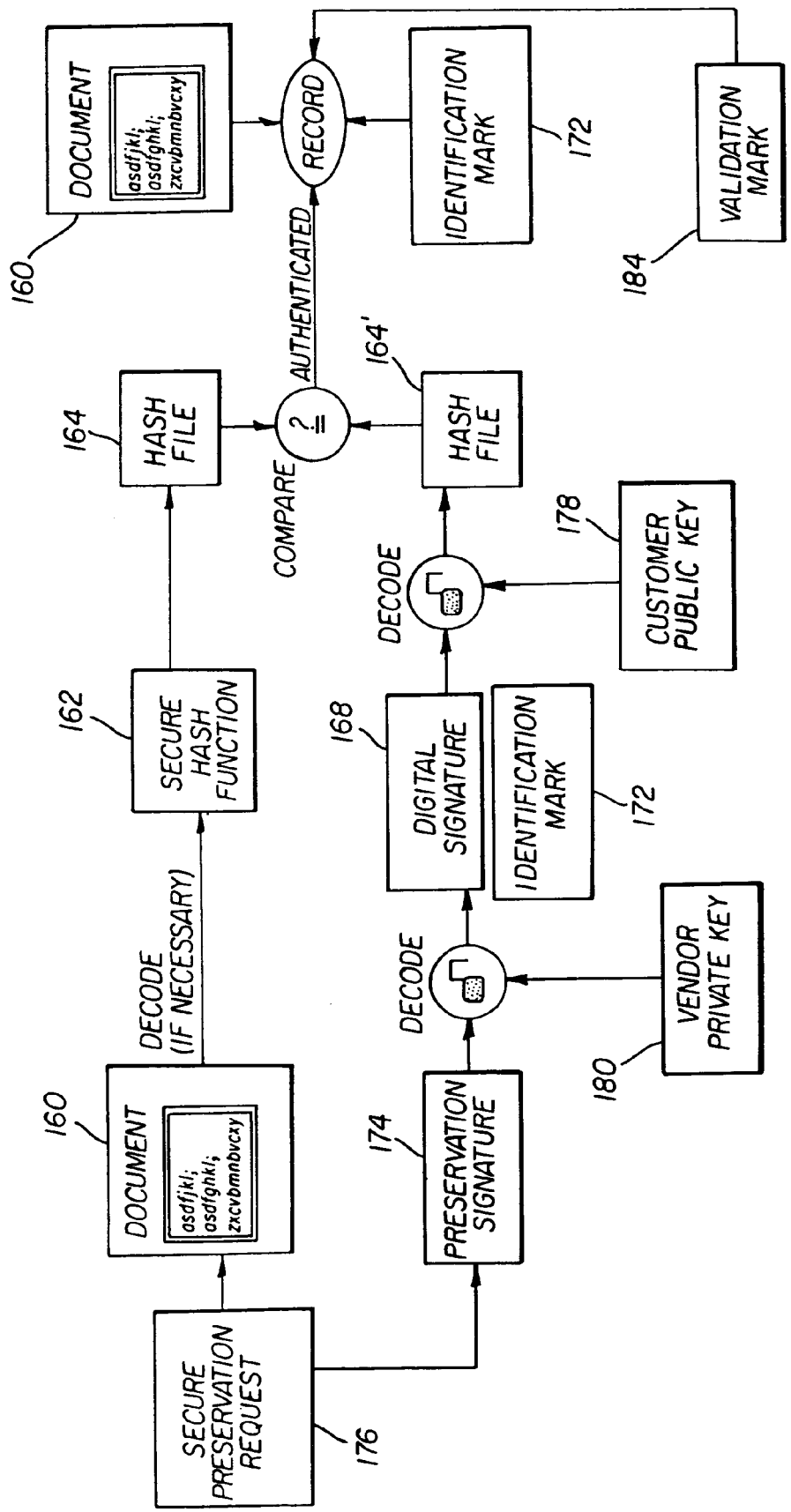
FIG. 9 is a block diagram showing an alternate process in which a vendor validation mark is applied.

In another alternate embodiment, as shown in FIG. 9, a validation mark 184, such as a stamp or other type of mark, may be added to the recorded data for a received document 160, as an indicator of validity asserted by the vendor of digital data preservation system 10. The example of FIG. 9 shows the processing of document 160 and digital signature 168, both obtained from secure preservation request 176, as was shown with reference to FIG. 5. Here, when decoded hash file 164' and hash file 164 are verified to be identical, validation mark 184 is added by the vendor at the receiving site, that is, at digital data preservation system 10. Then, document 160, identification mark 172, and validation mark 184 are all recorded, in human-readable form, onto preservation media 210, as was described with reference to FIG. 2. Validation mark 184 can include a certification timestamp from an authentication authority, verifying that document 160 has been authenticated, and can include time, date, certifying authority or location, and other key information. Validation mark 184 could alternately be a seal or other indicia unique to the vendor site, or be electronically generated, with each instance unique.

It should be noted that a validation marking scheme such as timestamping can be employed as part of a number of different processing steps, such as for creation of digital signature 168 or of secure preservation request 176. Timestamps can be appended as separate files to identification mark 172 or can be incorporated as part of secure preservation request 176, for example. Certification timestamps could alternately be obtained by the vendor to authenticate receipt of secure preservation request 176 at a certain time.

Figure 10:
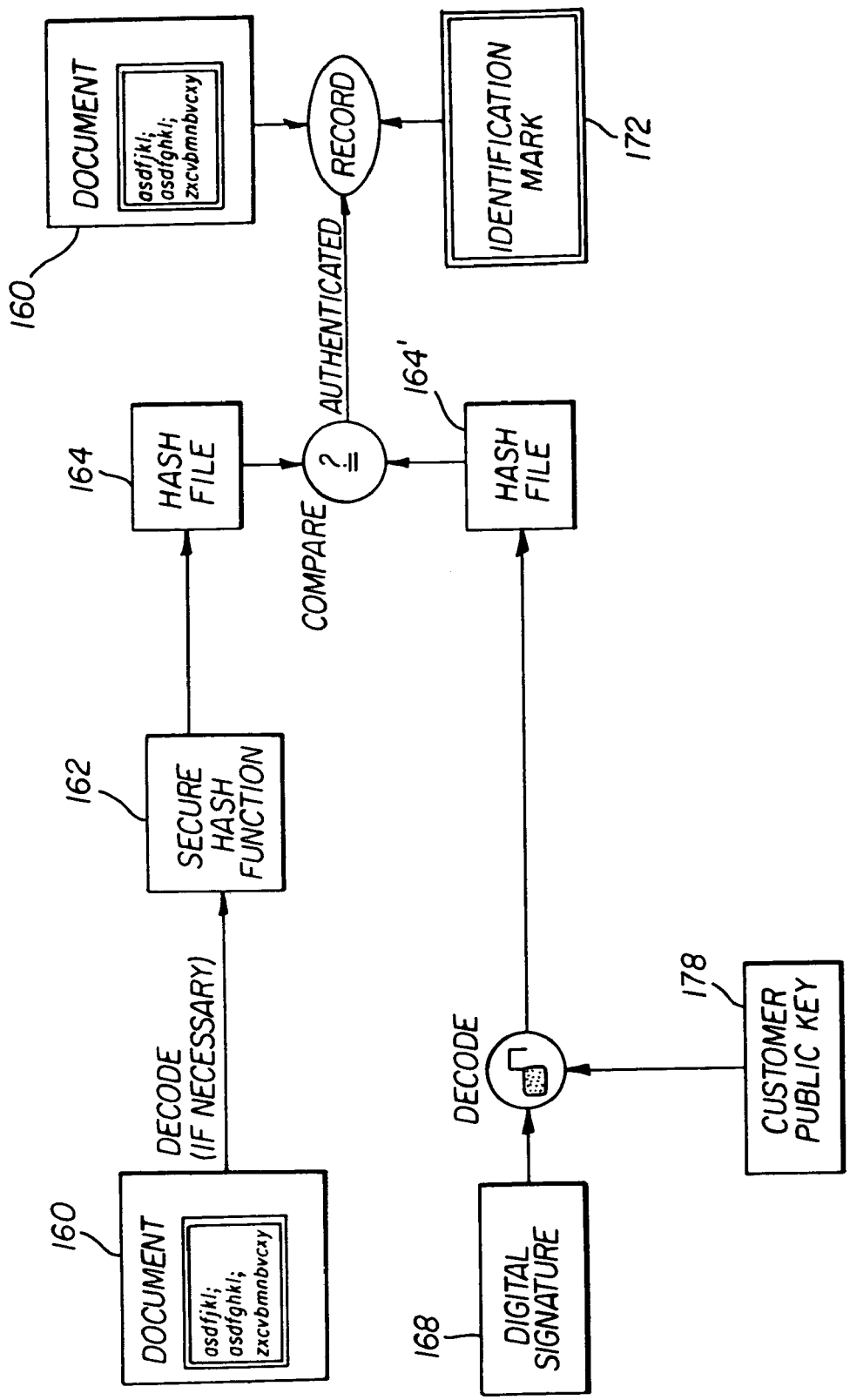
FIG. 10 is a block diagram showing an alternate process in which an identification mark is obtained by the vendor from a secure source and appended to a record for preservation.

In an alternate embodiment, where the customer does not provide identification mark 172, only the document 160 and digital signature 168 are provided to the vendor. This case is shown in FIG. 10. The vendor decodes digital signature 168 using the same procedure described in the preferred embodiment. After authenticating document 160, vendor of digital data preservation system 10 obtains a copy of customer's identification mark 172 from a secure source, such as a digital lockbox. The identification mark 172 is then appended to document 160 for recording onto human-readable preservation media 210. Optionally, a validation mark 184 can also be additionally recorded along side of the document 160 on human-readable preservation media 210.

Enhanced Secure Preservation Request

Figure 11:
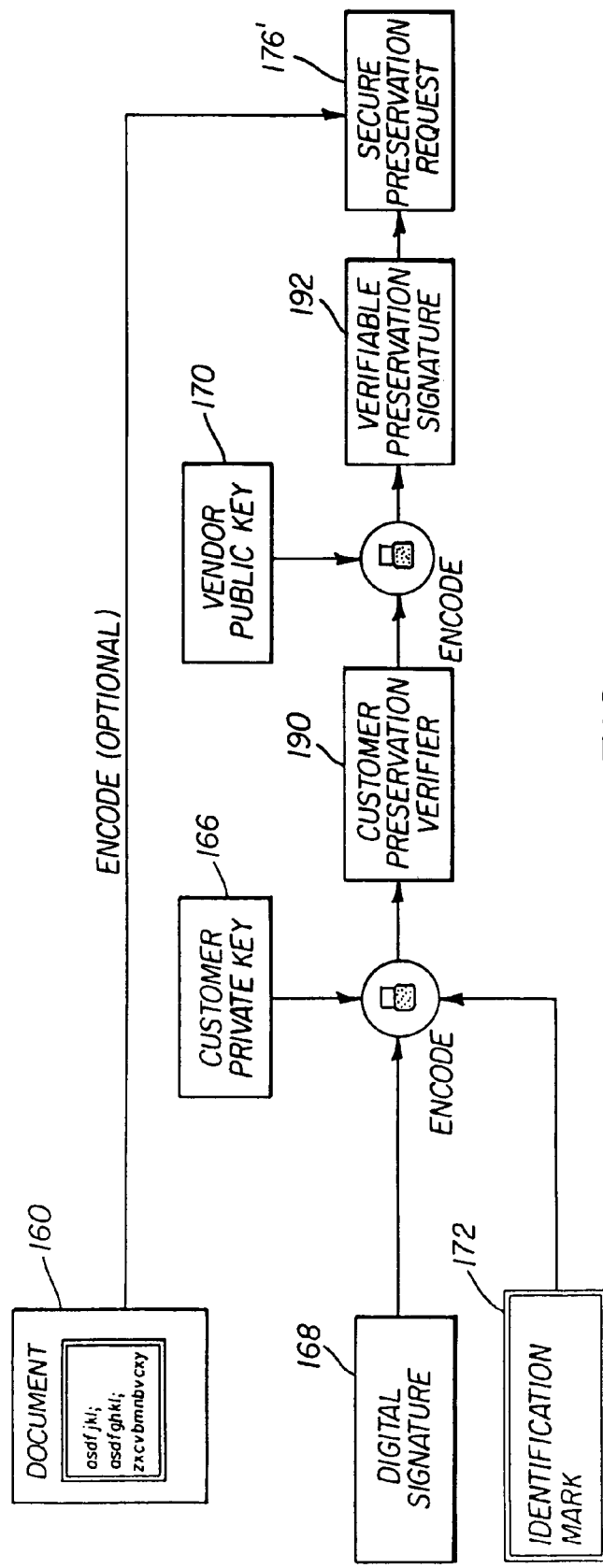
FIG. 11 is a block diagram showing an alternate process for providing a verifiable preservation signature for a preserved document.

In some cases, there may be advantages to taking extra precautions in order to prevent the use of a falsified digital signature for document 160. Referring to FIG. 11, there is shown the sequence of steps used to generate secure preservation request 176' that is enhanced to provide this added measure of protection. Digital signature 168 and identification mark 172 are encoded together, using customer private key 166 to form customer preservation verifier 190. Customer preservation verifier 190 is then encoded using vendor public key 170 to generate verifiable preservation signature 192. The combination of verifiable preservation signature 192 with document 160, which may itself be optionally be encoded, then forms an enhanced secure preservation request 176'. With this arrangement, only the intended vendor can decode verifiable preservation signature 192. Then, only the public key of the specific customer will enable decoding of customer preservation verifier 190.

Figure 12:
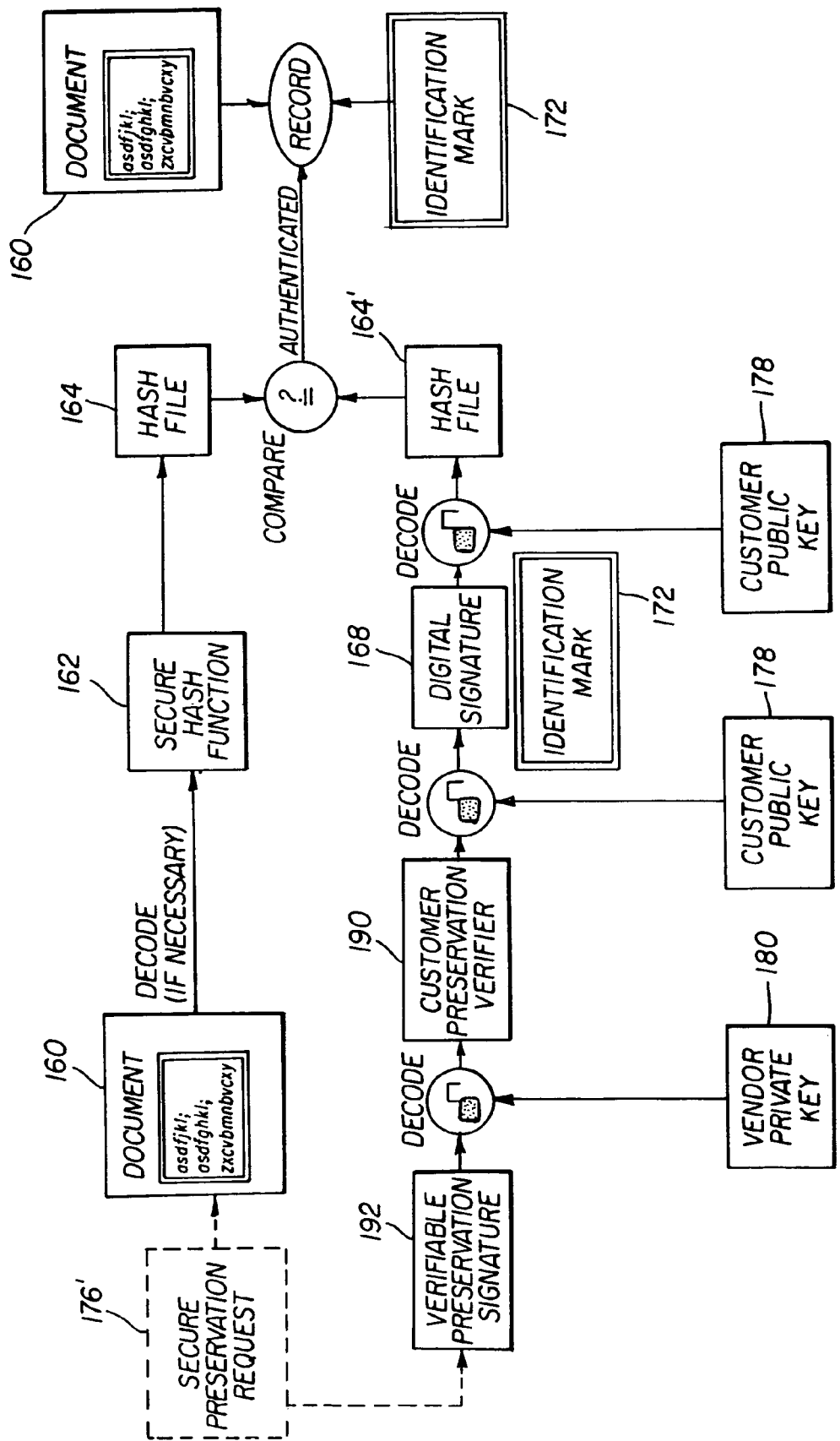
FIG. 12 is a block diagram showing the process for decoding the verifiable preservation signature created using the process of FIG. 11.

Referring to FIG. 12, there is shown the reverse process performed by the vendor at digital data preservation system 10 for verifying enhanced secure preservation request 176' that was obtained using the process of FIG. 11. Verifiable preservation signature 192 is decoded using vendor private key 180 to obtain customer preservation verifier 190. Then, using customer public key 178, customer preservation verifier 190 is decoded to obtain digital signature 168 and, where provided, identification mark 172. Digital signature 168 is decoded using customer public key 178 to obtain decoded hash file 164' which can then be compared with hash file 164 generated from document 160, as was shown in FIG. 9. When decoded hash file 164' and hash file 164 are identical, document 160 can be recorded, along with identification mark 172.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. The methods of the present invention provide a number of ways for preserving digitally signed documents 160 in a digital data preservation system 10. Notably, while the methods of the present invention are most advantageously suited to the requirements of long-term preservation, such as is provided by digital data preservation system 10, these methods may also be implemented with a system that provides document or image archival using conventional optical or magnetic media. While the methods of the present invention provide significant advantages when document data is represented in human-readable form, these methods could also be implemented with a system in which documents may be stored using conventional data representation methods or using some combination of human-readable and machine-readable data format. A number of different encoding and decoding schemes, known to those skilled in the data encoding arts, could be substituted for the conventional public key/private key arrangement described above.

Thus, what is provided is a digital preservation system for preservation of digitally signed document data on a human readable media.

Parts List

10 Digital data preservation system
12 Front end
18 Preservation apparatus
20 Control logic processor
24 Request handling/data routing preprocessor
26 Data processing element
30 Indexing database
40 Writer
42 Imager
44 Media processor
50 Physical storage apparatus
60 Retrieval handling processor
62 Data recovery processor
70 Media source
160 Document
162 Secure hash function
164 Hash file
164' Decoded hash file
166 Customer private key
168 Digital signature
170 Vendor public key
172 Identification mark
172a First identification mark
172b Second identification mark
174 Preservation signature
174a First preservation signature
174b Second preservation signature
176 Secure preservation request
176' Secure preservation request
178 Customer public key
180 Vendor private key
184 Validation mark
190 Customer preservation verifier
192 Verifiable preservation signature
200 Central processing unit (CPU)
202 Application
204 Operating system
206 Binary storage hardware
208 Binary storage media
210 Human-readable preservation media

What is claimed is:

1. A method for preserving a document data file provided by a customer to a vendor of data preservation services, wherein a digital signature is coupled to said document data file, the method comprising:
   (a) forming a secure preservation request by:
      (a1) encoding said digital signature, together with an identification mark from said customer, using said vendor's public key, to form a preservation signature;
      (a2) coupling said document data file with said preservation signature to form said secure preservation request;
   (b) transferring said secure preservation request to said vendor;
   (c) decoding said preservation signature using said vendor's private key to obtain said digital signature and said identification mark;
   (d) decoding said digital signature, using said customer's public key to obtain a first unique data verifier;
   (e) processing said document data file to obtain a second unique data verifier;
   (f) comparing said first and second unique data verifiers; and
   (g) recording the data encoding of said document data file and said identification mark onto an analog medium in human-readable form.

2. The method for preserving a document data file according to claim 1 further comprising the steps of encoding said document data file using said vendor public key and decoding said document data file using said vendor private key.

3. The method for preserving a document data file according to claim 1 wherein said human-readable form uses binary encoding.

4. The method for preserving a document data file according to claim 1 wherein said first unique data verifier is a hash file.

5. The method for preserving a document data file according to claim 1 further comprising the step of recording a validation mark onto said analog medium in human readable form.

6. The method for preserving a document data file according to claim 1 wherein said identification mark is supplied by the customer.

7. The method for preserving a document data file according to claim 1 wherein said identification mark is taken from the group consisting of entered text, a digitized image, a biometric mark, and scanned data.

8. The method for preserving a document data file according to claim 1 wherein said identification mark is electronically generated.

9. The method for preserving a document data file according to claim 5 wherein said validation mark comprises a certification timestamp.

10. A method for preserving a document data file provided by a customer to a vendor of data preservation services, wherein first and second identification marks are coupled to said document data file, the method comprising:
    (a) forming a secure preservation request by:
       (a1) encoding a digital signature, together with a first identification mark from said customer, using a private key, to form a first customer preservation verifier;
       (a2) encoding the digital signature, together with a second identification mark from said customer, using the private key, to form a second customer preservation verifier;
       (a3) coupling said document data file with said first and second preservation verifiers to form said secure preservation request;
    (b) transferring said secure preservation request to said vendor;
    (c) decoding portions of said secure preservation request using a vendor private key to obtain said first and second identification marks; and (d) recording the data encoding of said document data file and said first and second identification marks onto a analog medium in human-readable form.

11. The method for preserving a document data file according to claim 10 wherein said human-readable form uses binary encoding.

12. The method for preserving a document data file according to claim 10 further comprising the step of recording a validation mark onto said analog medium in human readable form.

13. The method for preserving a document data file according to claim 10 wherein said first identification mark is taken from the group consisting of entered text, a digitized image, a biometric mark, and scanned data.

14. The method for preserving a document data file according to claim 10 wherein said first identification mark is electronically generated.

15. A method for preserving a document data file according to claim 10 wherein the steps of encoding said first and second digital signatures comprise using a vendor public key.

16. The method for preserving a document data file according to claim 12 wherein said validation mark comprises a certification timestamp.

* * * * *